United States Patent [19]

Sundberg

[11] 4,411,969
[45] Oct. 25, 1983

[54] BATTERY CONSTRUCTION CHARACTERIZED BY REACTIVELY LIMITED GRIDLESS ELECTRODE MEANS, AND METHODS OF MAKING AND OPERATING SAME

[75] Inventor: Erik G. Sundberg, Newtown, Pa.

[73] Assignee: Koehler Manufacturing Company, Marlborough, Mass.

[21] Appl. No.: 261,282

[22] Filed: May 6, 1981

[51] Int. Cl.$^3$ ............................................. H01M 10/06
[52] U.S. Cl. ......................................... 429/50; 429/60; 429/228
[58] Field of Search ................... 429/225, 60, 228, 50, 429/94, 57, 59; 204/2.1

[56] References Cited

U.S. PATENT DOCUMENTS

| | | | |
|---|---|---|---|
| 3,395,043 | 7/1968 | Shoeld | 429/225 |
| 3,395,044 | 7/1968 | Shoeld | 429/225 |
| 3,536,531 | 10/1970 | Sekido et al. | 429/94 |
| 3,973,991 | 8/1976 | Cestaro et al. | 429/225 |
| 4,121,019 | 10/1978 | Garrett | 429/225 |

FOREIGN PATENT DOCUMENTS 49-22609  10/1974  Japan .................................. 429/225

*Primary Examiner*—Donald L. Walton
*Attorney, Agent, or Firm*—Hamilton, Brook, Smith and Reynolds

[57] ABSTRACT

A lead-acid battery construction includes gridless reactively limited positive and negative electrode means combined with separator material and an electrolyte. Reactive limitation of the negative electrode means may be realized by providing the negative electrode means with inner portions comprising non-reactive (i.e. solid) lead and outer portions of reactive (i.e. porous) lead. Reactive limitation of the positive electrode means may be provided by the said negative electrode means. The positive electrode means comprises $PbO_2$ which occurs in outer reacting portions and inner non-reacting portions. The battery having such reactively limited electrode means may only be discharged to the extent that the inner reactive lead portions of the negative electrode means become completely transformed into $PbSO_4$, whereupon all electrochemical reaction in the battery will cease. That portion of the $PbO_2$ of the positive electrode means which has not been transformed into $PbSO_4$ may be defined as the non-reacting portion. The electrode means as described above are further characterized by the non-reactive lead portions of the negative electrode means and the non-reacting portions of the positive electrode means being of sufficient mass to carry all required electrical current, both during charging and discharging of the battery. Thereby it becomes possible to provide a battery having gridless electrode means.

19 Claims, 33 Drawing Figures

| NON-REACTIVE LEAD | REACTIVE LEAD | SEPARATOR CONTAINING ELECTROLYTE | REACTING PbO$_2$ | NON-REACTING PbO$_2$ |
|---|---|---|---|---|
| NEGATIVE ELECTRODE | | | POSITIVE ELECTRODE | |

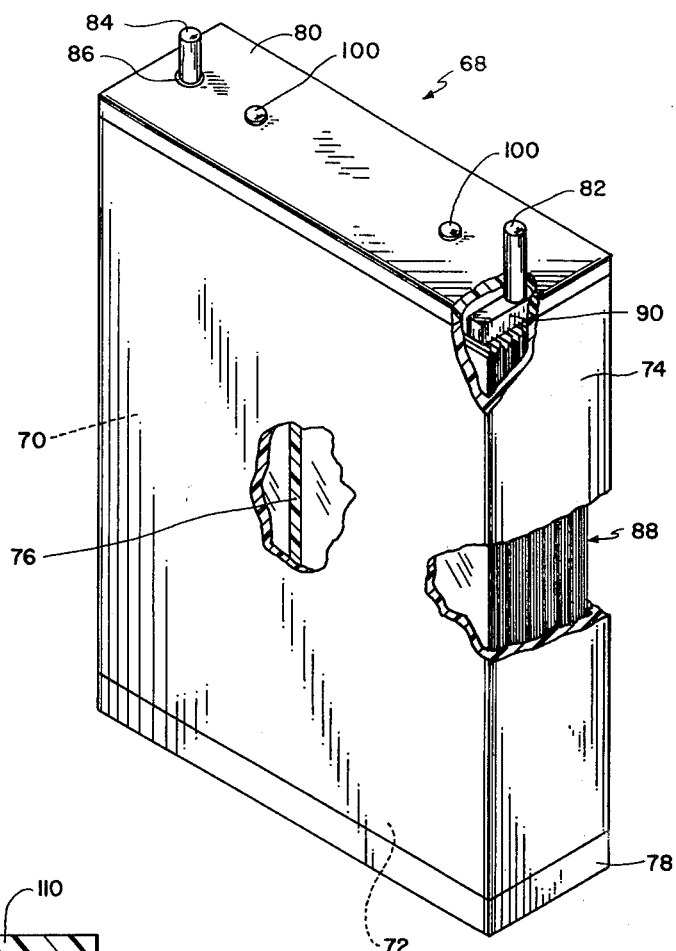
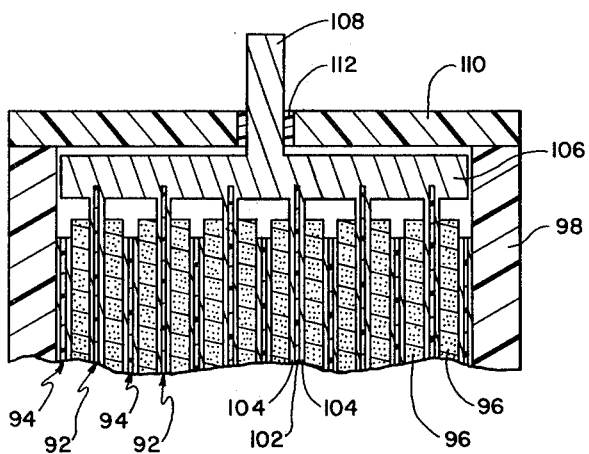
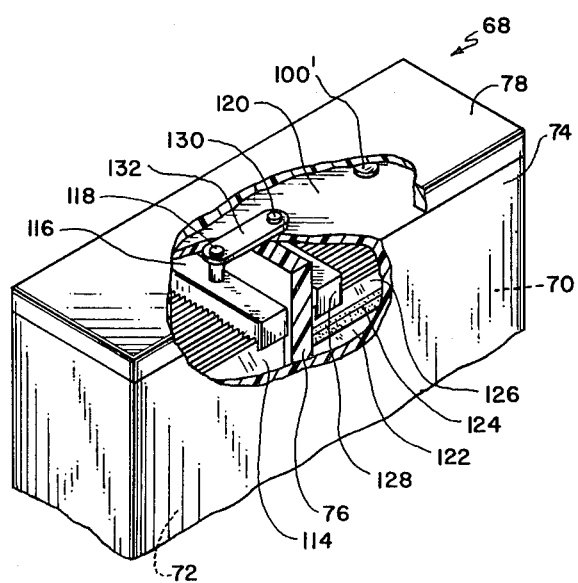
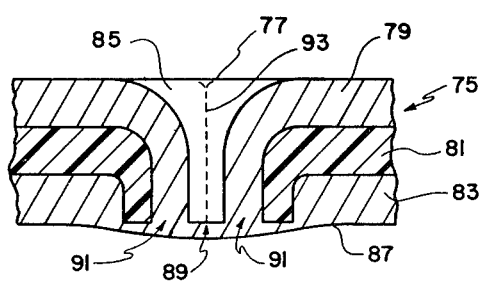

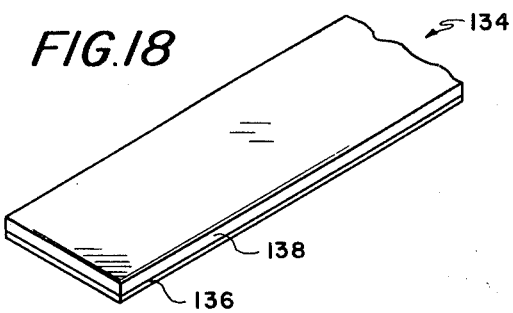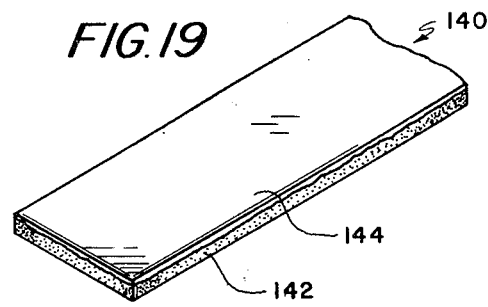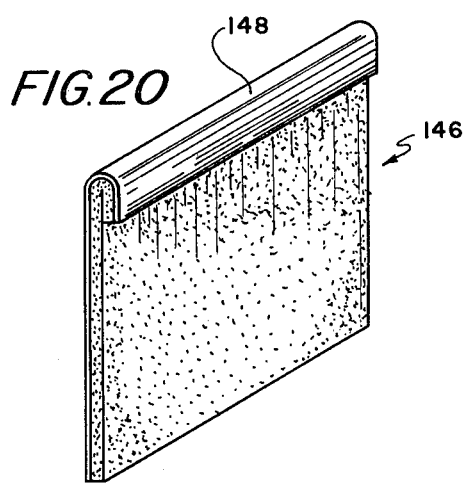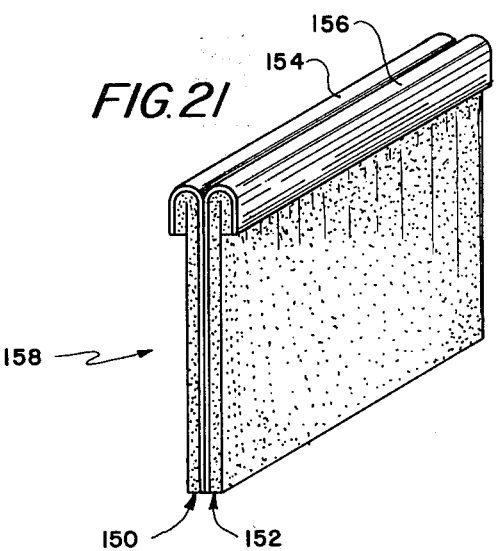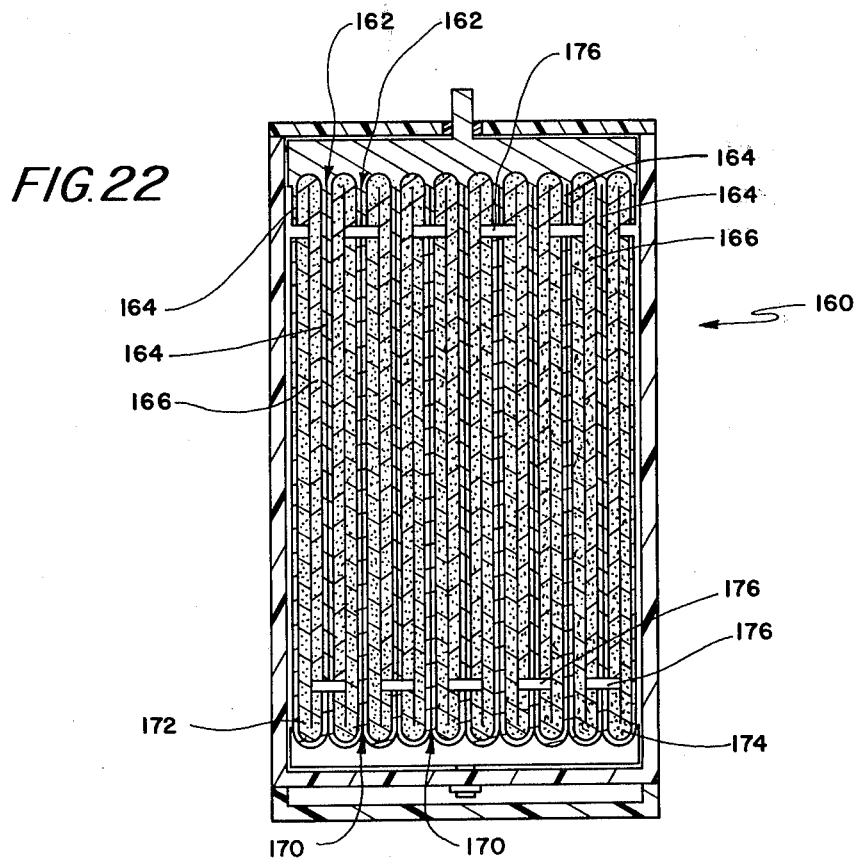

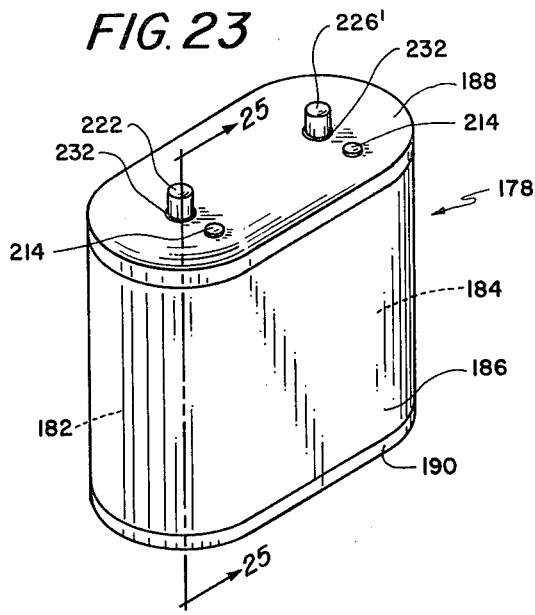
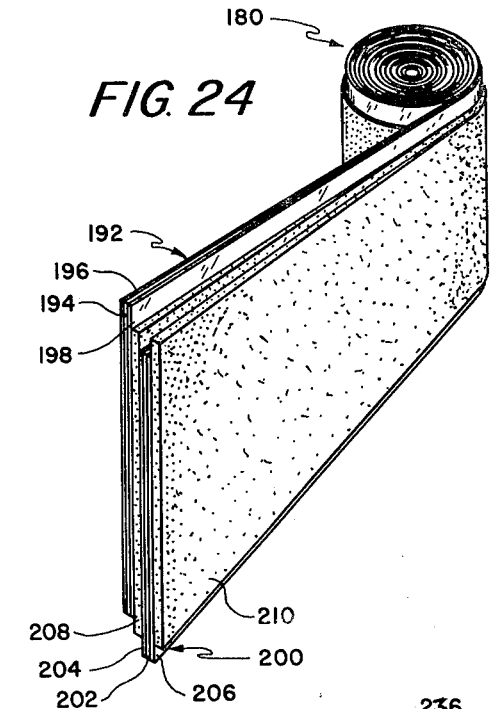
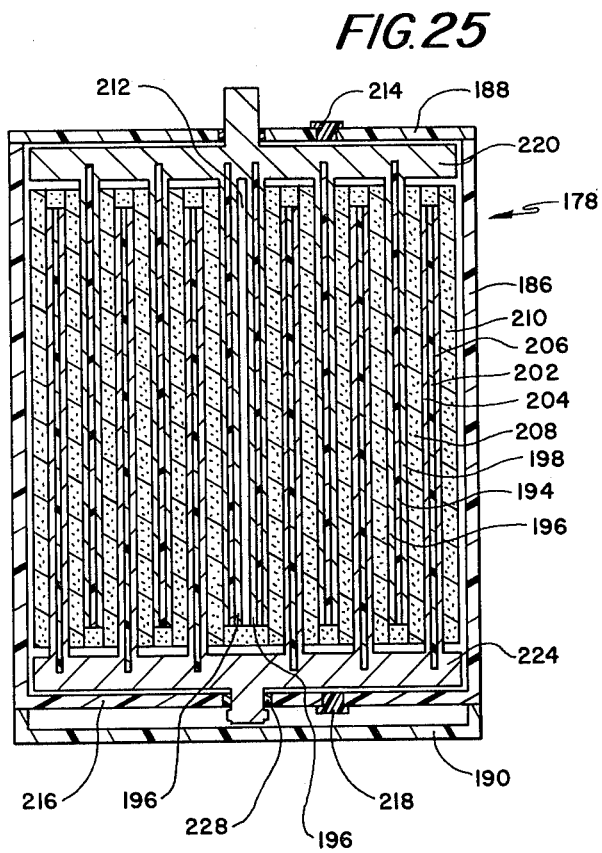
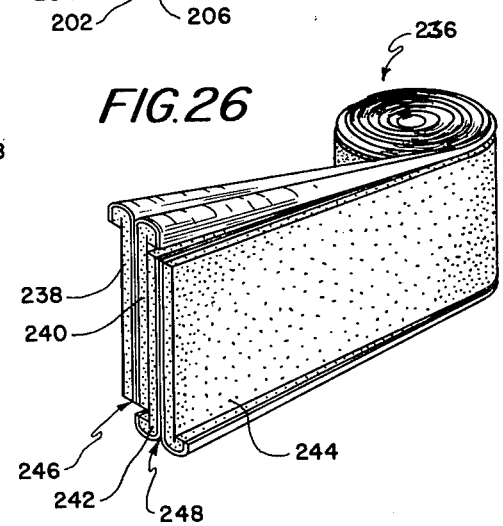
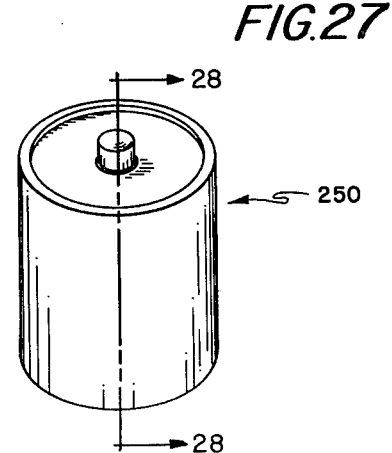

BATTERY CONSTRUCTION CHARACTERIZED BY REACTIVELY LIMITED GRIDLESS ELECTRODE MEANS, AND METHODS OF MAKING AND OPERATING SAME

FIELD OF THE INVENTION

In conventional lead-acid battery construction it is customary to employ a grid structure which may be of varying forms. One form may consist of a lead top bar, a terminal lug and depending spines. Another form of grid structures may comprise, for example, lead frames including a terminal lug. Still another form may comprise expanded or perforated lead sheet means including a terminal lug, etc., and still other forms may exist.

It is presently recognized by those skilled in the lead-acid battery art that there is a need for lead acid batteries having increased power-to-weight and power-to-volume ratios. There also exists a need, of even greater importance, for a lead-acid battery construction which is of a substantially maintenance-free nature and which is capable of repeated deep cycling over extended periods of time. In addition, it is well known that, in the manufacture of lead-acid batteries of the type having grids as noted above, methods employed may involve certain environmental and health hazards due to the presence of lead particles which may attend present manufacturing operations.

Various attempts have been made to meet these needs, but in no case has any proposal of record disclosed a lead-acid battery construction having reactively limited electrodes wherein $PbO_2$ serves as the sole current carrying means in the positive electrodes as well as constituting chemically reacting means; nor is there a disclosure of record of gridless battery construction, nor methods of making or operating such a gridless battery.

SUMMARY OF THE INVENTION

The present invention relates to improved lead-acid battery construction and also to improvements in making and operating such improved lead-acid batteries.

A chief object of the invention is to devise a lead-acid battery construction of a unique nature characterized by reactively limited electrode means.

Another object of the invention is to devise, in one or more practical forms, a battery construction having greatly increased power-to-weight and power-to-volume ratios in a degree significantly greater than is presently known to those skilled in the art, capable of faster discharging and recharging and also capable of deep cycling over long periods of time in a manner not heretofore realized.

Another object is to devise a method of fabricating a battery construction utilizing gridless electrodes wherein environmental as well as health hazards may be substantially controlled or eliminated.

Still another object is to provide a sealed lead acid battery including positive and negative electrodes and separator means containing electrolyte, in which the separator means is less than fully saturated with the electrolyte, thus allowing oxygen to pass easily between positive and negative electrodes but in which a surfeit of operating electrolyte is available to the electrodes.

It has been discovered that the foregoing objectives may be realized based on a reactively limited electrode concept for constructing a lead-acid battery wherein gridless positive and negative electrodes may be formed and combined with separator material and an electrolyte such as sulfuric acid.

This limited retarded electrode concept has originated from a recognition of the fact that lead may occur in a reactive form, i.e. sponge lead, and also in a non-reactive form, i.e. solid lead; and secondly from a conceptual realization that $PbO_2$, when suitably utilized, may present reacting portions and non-reacting portions of $PbO_2$ which may exist concurrently in very desirable forms in a common electrolyte environment with reactive and non-reactive forms of lead.

From these conceptual realizations, it has been determined that: (1) there may be provided negative electrodes in which reactive and non-reactive portions of lead are present; (2) there may also be provided positive electrodes in which reacting and non-reacting portions of $PbO_2$ are present; (3) dimensional characteristics of reactive lead portions of the negative electrodes may define and control dimensional characteristics of reacting $PbO_2$ portions of the positive electrode; (4) reactive lead portions of negative electrodes and reacting $PbO_2$ portions of positive electrodes, in combination with an electrolyte, may electrochemically generate a required electrical current; and (5) non-reacting $PbO_2$ portions of positive electrodes and non-reactive lead portions of negative electrodes may cooperate to conduct a specified electrical current over a required period of time; and in addition, when positive and negative electrodes comprise thin foil bodies: (6) surface areas of the said electrodes, with respect to thickness of these electrodes, may be substantially greater than those of conventional electrodes thus allowing for faster discharge and recharge; and that (7) virtually any foraminous separator means of conventional construction combined with such electrodes may be sufficiently thick so as to provide an excess of electrolyte to the electrodes without the separator means in itself being fully saturated with the said electrolyte.

Construction of a lead acid battery based on these relationships may be summarized as the selective combination of reactively limited negative electrode means, having reactive and non-reactive portions of lead, with positive electrode means having reacting and non-reacting $PbO_2$ portions determined by the negative electrode means, in the presence of an electrolyte and separator means. This selective combination of components is further characterized by the reactive lead portions of the negative electrode means occurring in a mass capable of determining and limiting the mass of the reacting $PbO_2$ of the positive electrode means to an extent which will enable the reactive lead portions of the negative electrode means and reacting $PbO_2$ portions of the positive electrode means, in in the presence of electrolyte means, to generate an electrical current of a magnitude which can be cooperatively conducted by the non-reactive lead portions of the negative electrode means and the non-reacting $PbO_2$ portions of the positive electrode means arranged in series with one another.

BRIEF DESCRIPTION OF THE DRAWINGS

FIG. 15 is a perspective view, partially broken away, of one preferred embodiment of the invention constituting 4-volt battery mans for miner's cap lamp operation.

FIG. 16 is a fragmentary cross-sectional view of an upper portion of a battery of a construction similar to that of the battery shown in FIG. 15, and further illustrating electrodes interconnected.

FIG. 17 is a perspective view, partially broken away, of a bottom portion of the battery means of FIG. 15 also showing means for interconnecting the cells.

FIG. 17A is a fragmentary view of a modification of the foil construction of FIG. 5.

FIG. 18 is a perspective view showing a modified gridless electrode of the invention.

FIG. 19 is a perspective view showing a portion of a composite electrode for use in a battery of the invention comprising separator means having a layer of lead on one side thereof.

FIG. 20 is a view showing an unformed composite electrode similar to that of FIG. 19 and having a folded edge portion which locates the lead layer in a desirable position.

FIG. 21 is a view showing a pair of unformed composite electrodes similar to that of FIG. 20 occurring in abutting relationship.

FIG. 22 is a cross-sectional view of a battery structure which includes composite electrodes similar to those shown in FIGS. 20 and 21.

FIG. 23 is a perspective view of a modified form of 4-volt miner's cap lamp battery having a "jelly-roll" type of electrode and separator arrangement.

FIG. 24 is a perspective view showing a "jelly-roll" construction utilizing gridless electrodes similar to that shown in FIG. 5 and combined with separator means, partially unrolled.

FIG. 25 is a cross-sectional view of one cell of a multi-cell battery having a "jelly-roll" construction of the type shown in FIG. 24 and further indicating a terminal and an intercell connector.

FIG. 26 is a view similar to FIG. 24 but showing a construction employing composite electrodes of the type shown in FIG. 21.

FIG. 27 is a perspective view showing a single cylindrical cell having a "jelly-roll" type of internal construction.

DETAILED DESCRIPTION OF THE INVENTION

As earlier pointed out, this invention is concerned with battery structures characterized by reactively limited gridless electrode means and methods of making an operating such battery structures. The Figures noted above include FIG. 1, showing in general a battery of the invention connected to an operating load and being representative of any battery of the invention; FIGS. 2–6, dealing with test cell embodiments of the invention; FIGS. 7–9 and 14, which relate to changes in the battery during charging and discharging operations; FIGS. 10–13, which relate to an electrochemical formation of the battery structure in accordance with the invention; FIGS. 15–17, which relate to one specific construction for a miner's cap lamp battery of non-cylindrical configuration; FIGS. 18–21, which relate to modifications of gridless electrode construction; FIG. 22, which shows a modified form of non-cylindrical battery; and FIGS. 23–32 which relate to forms of generally cylindrical batteries having an internal construction of the so-called "jelly-roll" class.

Figure 1:
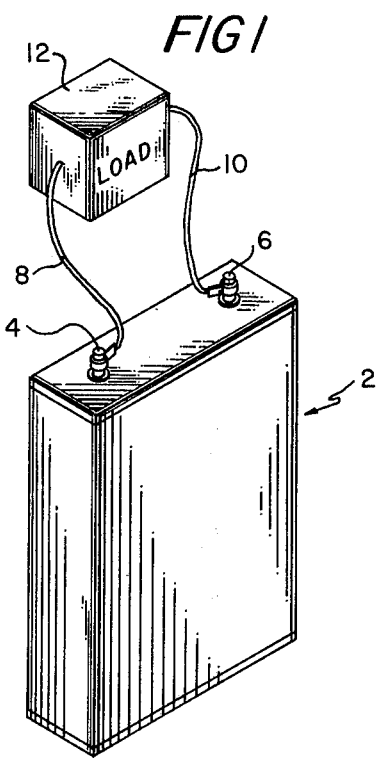
FIG. 1 is a perspective view illustrating in general battery means of the invention wherein a gridless electrode arrangement is employed, and the battery means being shown directly connected to an operating load.

Referring in detail to the drawings, FIG. 1 illustrates a gridless battery of the invention denoted by arrow 2 and having a non-cylindrical form. Positive and negative terminals 4 and 6 are shown connected by conductors 8 and 10, respectively, to a simulated operating load 12 of an appreciable nature.

It will be understood that this gridless battery is characterized by negative electrode means having reactive and non-reactive lead portions and by positive electrode means which may be divided into reacting and non-reacting $PbO_2$ portions. It will also be understood that battery 2 may be illustrative of a battery made up of a plurality of current generating cells which may be designed for meeting a range of desired requirements.

In a battery structure having negative and positive electrode means, as specified with reference to FIG. 1, inventive aspects are present not only in the combination of parts but also in the choice of components employed, the manner in which the components are assembled, and the way in which they operate in typical battery cycling.

Figure 2:
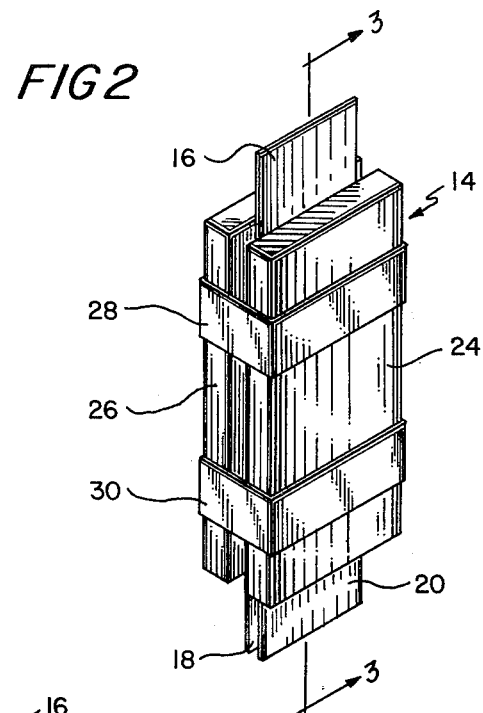
FIG. 2 is a perspective view of a simplified form of battery means of the invention showing gridless electrode means and retainer means therefor.
Figure 3:
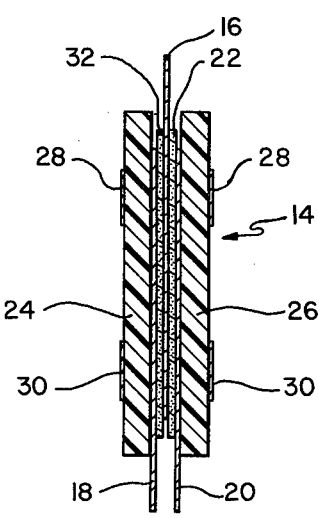
FIG. 3 is a cross-section taken on the line 3—3 of FIG. 2 and illustrating in further detail said gridless electrodes and separator means.
Figures 6, 7:
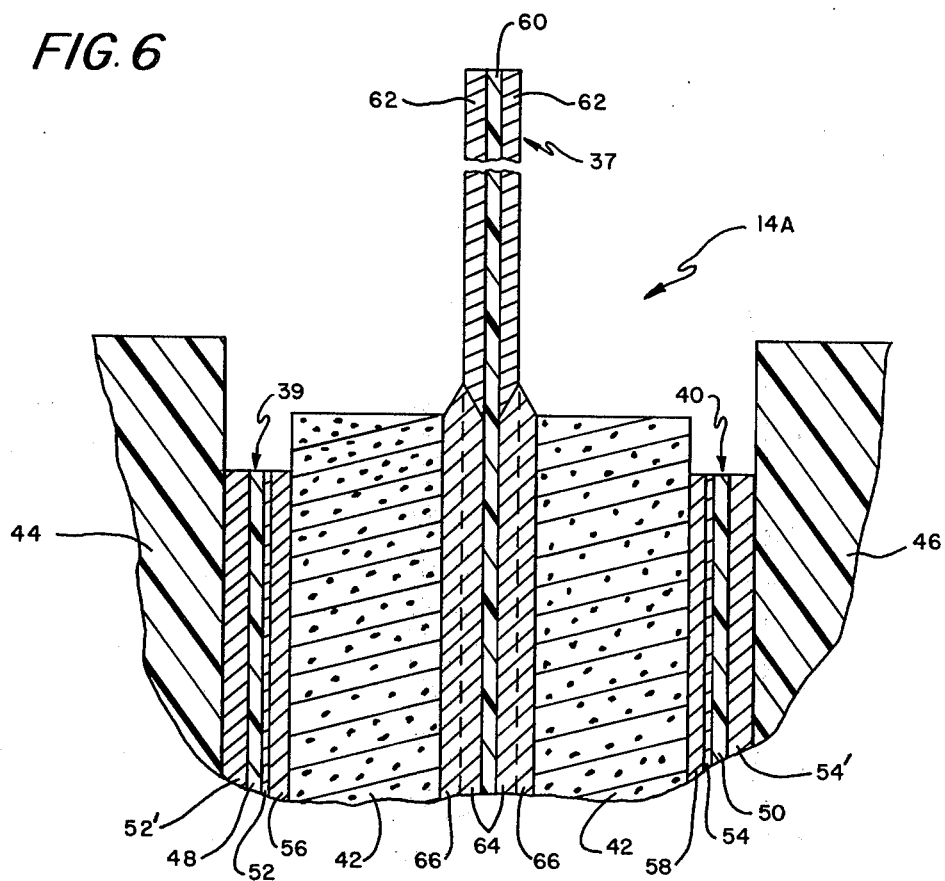
FIG. 6 is a fragmentary cross-sectional view showing in further detail portions of a battery means similar to that of FIG. 3.
FIG. 7 is a diagrammatic view illustrating a portion of the battery means of FIG. 6.

In view of this plurality of inventive aspects, it is believed that consideration of the construction and operation of a single "test cell", such as that illustrated in FIGS. 2 and 3, as well as the test cell illustrated on a larger scale in FIG. 6, may provide a means by which these inventive aspects may be most readily perceived.

The simple test cell shown in FIGS. 2 and 3 is generally denoted by arrow 14 and is characterized by a construction in which there are employed electrodes in the form of thin foil.

Numeral 16 denotes a thin foil element which constitutes a positive electrode for the test cell of FIGS. 2 and 3. Numerals 18 and 20 denote thin foil bodies arranged to constitute negative electrodes of the test cell. These foil components are also shown in more detail in FIG. 4.

Figure 4:
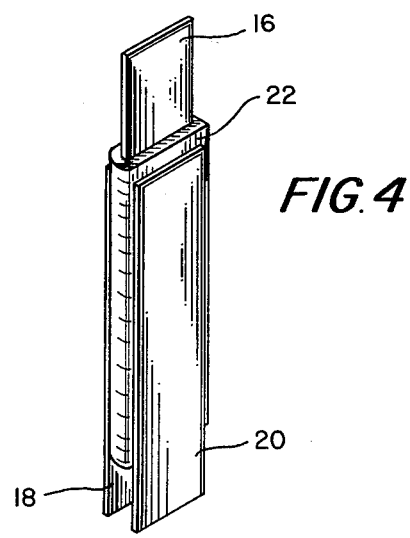
FIG. 4 is a perspective view illustrating the gridless electrode and separator means without the retaining means shown in FIGS. 2 and 3 and without electrolyte.

Located between the electrodes in abutting relationship therewith is separator means 22, most clearly shown in FIG. 4. As is customary in making battery separator means there is utilized a foraminous material which is substantially chemically inert in a sulfuric acid environment. Examples of suitable separator materials include glass wool, needle punched polyester, and the like.

It will be observed that separator means 22 may be folded about positive electrode foil component 16 which projects upwardly beyond the upper end of separator means 22, as is shown in more detail in FIG. 4.

In FIG. 3 it will be further noted that the lower end of separator means 22 extends beyond the lower end of foil component 16. Components 18 and 20 are also arranged in abutting relationship with outer sides of separator means 22 such that the lower ends of components 18 and 20 project considerably beyond the lower end of separator means 22 and such that the upper end of separator means 22 extends beyond upper ends of components 18 and 20. With such an arrangement adjacent foil surfaces are always isolated from one another by some portion of separator means 22.

Figure 5:
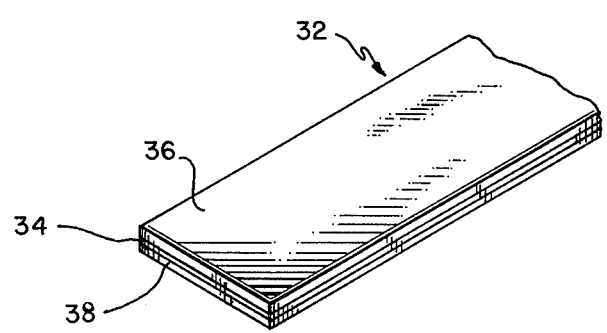
FIG. 5 is a perspective view, showing in further detail the form of gridless electrode shown in FIGS. 2 3 and 4.

It may be desired to combine the foils of FIGS. 2 and 3 with substrates to form laminated bodies, as has been illustrated, for example, in FIG. 5 and denoted by arrow 32. In this laminated body of FIG. 5 there is employed a thin substrate 34 of a plastic material which is substantially chemically inert in a sulfuric acid environment and which is located between layers 36 and 38 of lead. Typically, the substrate may comprise a plastic material such as polyester, polypropylene, etc., and the outer lead layers may be applied to the substrate by various processes such as vacuum deposition, rolling, electrodeless plating, adhesive means, and the like.

In accordance with a further aspect of the invention, there are provided foil and separator components for the test cell of FIGS. 2 and 3 whose dimensional relationship to one another is specified. For example, in one desirable embodiment of the test cell described, separator means 22 may have a thickness of 0.4 millimeters and, in combination with a separator of this thickness, there may be employed laminated foil components such as are denoted by the arrow 32 in FIG. 5. In this laminated foil arrangement there are employed outer lead layers 36 and 38 of a thickness of 25 microns in combination with a substrate 34 having a thickness of 25 microns. It will be understood that other dimensional relationships may be employed in accordance with particular battery requirements.

Such components, when assembled as described, constitute a test cell 14 which is ready to receive a "formation electrolyte" such as a relatively low specific gravity sulfuric acid. Addition of the electrolyte may be readily accomplished by immersing the cell body in a sulfuric acid bath until the separator means becomes partially saturated, e.g. 80% saturated.

A final step in the preparation of test cell 14, and a still further inventive aspect, is a controlled processing operation which enables cell 14 to generate an electrical current. This is achieved by subjecting the cell to a limited electrochemical forming process of the Planté formation class wherein electrochemical forming is controlled in a manner so as to provide a cell characterized by reactively limited electrode portions. These electrode portions are of a predetermined nature as earlier specified, and include negative electrodes having reactive and non-reactive lead portions which determine and limit the extent of reacting and non-reacting portions of $PbO_2$ in the positive electrode.

In thus carrying out a controlled electrochemical formation to provide reactively limited electrodes for the cell 14 it will be understood that it is necessary for an electrical current to be conducted through the cell and, when this occurs, portions of the electrodes, in the presence of an electrolyte, undergo chemical changes in composition to produce both reactive and non-reactive forms of lead. It is pointed out that an essential part of the reactive limitation of the negative electrodes of the invention is the fabrication of the said negative electrodes having reactive (porous) lead portions and non-reactive (solid) lead portions of predetermined extent. Such fabrication may be carried out in a number of ways well-known in the art; the controlled electrochemical forming process hereinafter disclosed is a preferred embodiment, but other methods of providing reactive limitation are deemed to fall within the scope of the invention.

As an aid to more readily visualizing these chemical changes and the limited extent to which they take place in accordance with the invention, another test cell 14A has been illustrated in FIG. 6. In this test cell 14A electrochemically formed electrodes are shown on a greatly enlarged scale in which dimensional relationships may be more readily perceived.

Thus, in place of the negative electrodes 18 and 20 of FIGS. 2 and 3, as they would appear in an electrochemically formed state, there are illustrated in FIG. 6 electrochemically formed negative electrodes 39 and 40 which include plastic substrates 48 and 50 wherein the electrochemical formation has been controlled so as to produce layers 56 and 58 of reactive lead, i.e. sponge lead, and layers 52 and 54 of non-reactive lead, i.e. solid lead.

Similarly, FIG. 6 illustrates a positive electrode 37, in place of electrode 16 of FIGS. 2 and 3, which includes a plastic substrate 60 wherein electrochemical formation has been controlled to produce, at either side of the substrate, outer layers of $PbO_2$. As earlier disclosed the layers of $PbO_2$ comprise both reacting and non-reacting $PbO_2$ portions, as has been illustrated diagrammatically in FIG. 6, wherein numeral 64 denotes non-reacting $PbO_2$ and numeral 66 denotes reacting $PbO_2$.

The relative thicknesses of the two portions 64 and 66 of the PbO$_2$ layers are determined and limited by the amount of reactive lead 56 and 58 present in the negative electrodes denoted by arrows 39 and 40 respectively. It will be observed that an upper portion of the positive electrode 37 has not undergone electrochemical change, and therefore layers as 62 of lead will remain at this upper portion of electrode 37.

It will be understood that controlled Planté formation of cell 14A to provide the reactively limited electrodes disclosed, as noted above, may involve specific processing steps which are hereinafter disclosed in detail. However, assuming that cell 14A is in a suitably formed state, a consideration of the invention method of operating the reactively limited electrodes is desirable since control of chemical reactions during operation may be closely related to control of chemical reactions in Planté formation.

With this in mind, to prepare cell 14A for operation, it will customarily be necessary to raise the specific gravity of the formation electrolyte to an operating level (e.g. 1.320 specific gravity). Any "formation additives" present may be allowed to remain in the battery. The electrolyte gravity may be raised by suitable means, e.g. by adding a predetermined quantity of very high gravity acid (for example, 1.450 specific gravity acid) such that the resultant mixture will be of a desired specific gravity, or by removing the formation electrolyte by a vacuum process and then introducing an operating electrolyte of the desired specific gravity by a similar vacuum process, etc.

In FIG. 7 there is indicated diagrammatically a battery similar to cell 14A in which battery components are shown separately in a composite block diagram representing a battery at rest (i.e. neither undergoing charging nor discharging).

Referring in more detail to FIG. 7, it will be noted that essential elements include: (1) a negative electrode comprising reactive and non-reactive lead portions; (2) separator means containing electrolyte; and (3) a positive electrode which may be divided into reacting and non-reacting portions of PbO$_2$.

Figure 8:
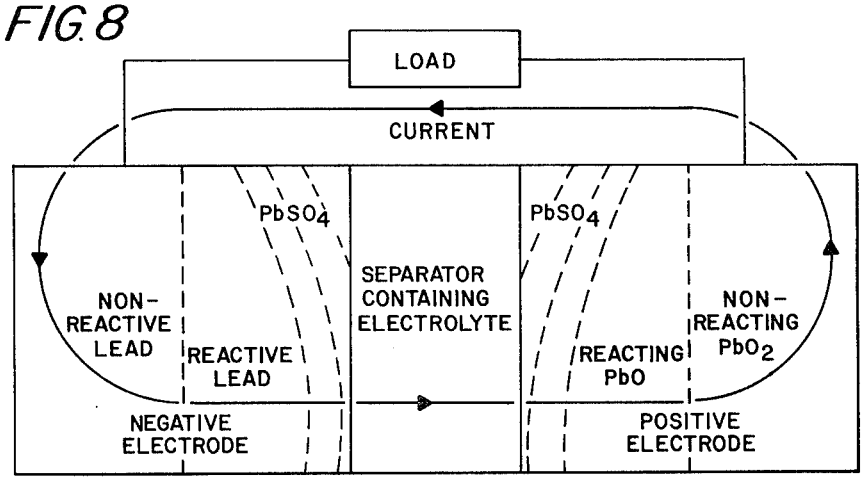
FIG. 8 is a diagrammatic view of the battery means of FIG. 7 connected to an operating load and illustrating chemical changes taking place during battery discharge and further showing non-reacting $PbO_2$ maintained as a sole current conducting means in a positive electrode.

FIG. 8 is a diagrammatic representation of the component parts of FIG. 7 connected to a typical electrical load. As electrical current, indicated by the directional arrow, is produced by the battery the reactive lead portion of the negative electrode and the reacting PbO$_2$ portion of the positive electrode become gradually electrochemically transformed into PbSO$_4$ (as indicated by curved dashed lines) by the reactions known to the art as the "double sulfate" reactions. These reactions and their associated resultant transformations of the reactants take place and continue to take place as long as the load is connected to the battery and until the reactive lead portion of the negative electrode has been completely transformed into PbSO$_4$. The reactions will then cease, since the non-reactive lead portion of the negative electrode (in contrast to the reactive lead portion) is not porous and, since the sulfuric acid of the electrolyte does not have access to the interior of the mass of this non-reactive lead, no further reaction can take place.

With further reference to FIG. 8, that portion of the PbO$_2$ of the positive electrode which has become transformed into PbSO$_4$ during the aforementioned reaction is called "reacting PbO$_2$". That portion of the PbO$_2$ of the positive electrode remaining after the reactions have ceased is called "non-reacting PbO$_2$", since this portion of the PbO$_2$ has not undergone electrochemical reaction. This serves to highlight one extremely important facet of the invention. Since the positive electrode is of gridless construction, i.g. there is no specially fabricated current carrying lead structure such as a typical grid fabricated with a lead frame and various cross members present in this electrode, the non-reacting PbO$_2$ portion of this electrode must be of a mass sufficient to provide the current carrying function of a grid, i.e. to carry all of the current required by the load and generated by the battery at all times during charge and discharge. The negative electrode is of gridless construction as well, although its non-reactive lead portion may be regarded as having some similarity to a grid. This non-reactive lead portion of the negative electrode must also be of a mass sufficient to carry all of the current as noted above.

Since the aforementioned reactions are limited by the amount or mass of reactive lead present in the negative electrode, the total amount of PbO$_2$ in the positive electrode including both reacting and non-reacting PbO$_2$, must be of a mass such that, that portion of the said PbO$_2$ in the positive electrode which has not undergone electrochemical reaction (this portion being referred to as "non-reacting") is sufficient to carry the required current for the load as disclosed above.

Figure 9:
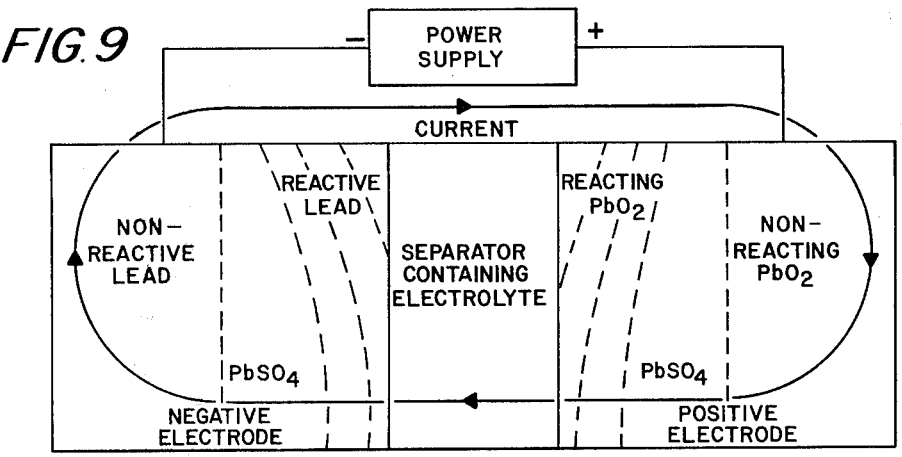
FIG. 9 is a diagrammatic view illustrating chemical changes in the battery means of FIGS. 7 and 8 taking place during recharge and also indicating diagrammatically non-reacting $PbO_2$ maintained as a sole current conducting means in the positive electrode.

FIG. 9 is a diagrammatic representative of the component parts of the battery of FIG. 8 starting in a discharged condition and connected to a power supply for recharging. As charging current provided by the power supply, as indicated by the directional arrow, flows through the battery the PbSO$_4$ of the positive and negative electrodes gradually becomes electrochemically transformed back into recting PbO$_2$ and reactive lead, respectively. These electrochemical transformations also result from the well known double sulfate reactions.

Considering next details of the controlled Planté formation of the invention earlier noted in reference to test cell 14A, reactively limited electrodes of the class disclosed are subjected to a controlled electrochemical formation of PbO$_2$ from lead in sulfuric acid in which may be contained an anion-providing formation additive (e.g. KClO$_4$) which will produce a soluble lead salt. In such a formation the PbO$_2$ formed will be in direct proportion to the formed capacity expressed in ampere-hours.

To make a negative electrode utilizing a Planté process it is first necessary to form such an electrode at least partially into a positive electrode, and then to reform it into a negative electrode. This formation may be made separately, forming the negative electrode against a dummy, but in a preferred method the positive electrode and the reactively limited electrode of the battery of the invention are formed together in situ. That electrode which is ultimately to be a negative electrode is first partially formed into a positive electrode and, when a predetermined portion of the lead of this electrode (this portion to correspond with the aforementioned "reactive lead") has been transformed into PbO$_2$, reversing the formation current and continuing formation until all of the PbO$_2$ present in the final negative electrode has been transformed into reactive lead and until at least a corresponding amount of the lead present in the final positive electrode has been transformed into PbO$_2$. It is this selectively controlled formation process which provides the reactively limited electrodes characteristic of the invention.

Figure 10:
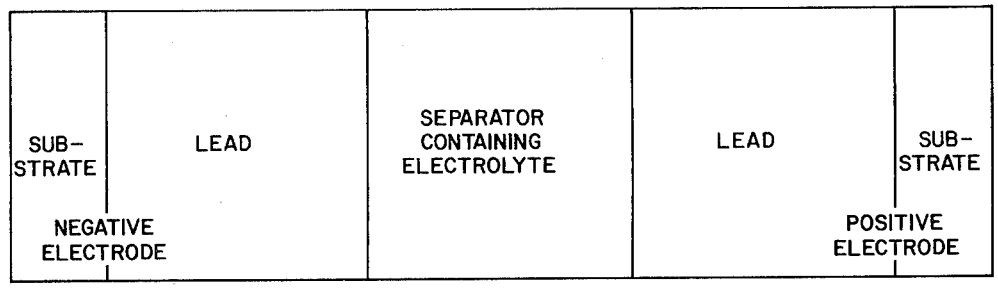
FIG. 10 is a diagrammatic view of a battery of the invention having gridless electrodes in an electrochemically unformed state.

FIGS. 10–13 illustrate diagrammatically the steps of this Planté formation in situ. FIG. 10 illustrates portions of component parts of a battery of the invention, prior to formation. In this Figure there are indicated diagrammatically substantially identical positive and negative electrodes, comprising metallic lead on a suitable substrate, combined with separator means, said separator means having "formation electrolyte" contained therein.

Figure 11:
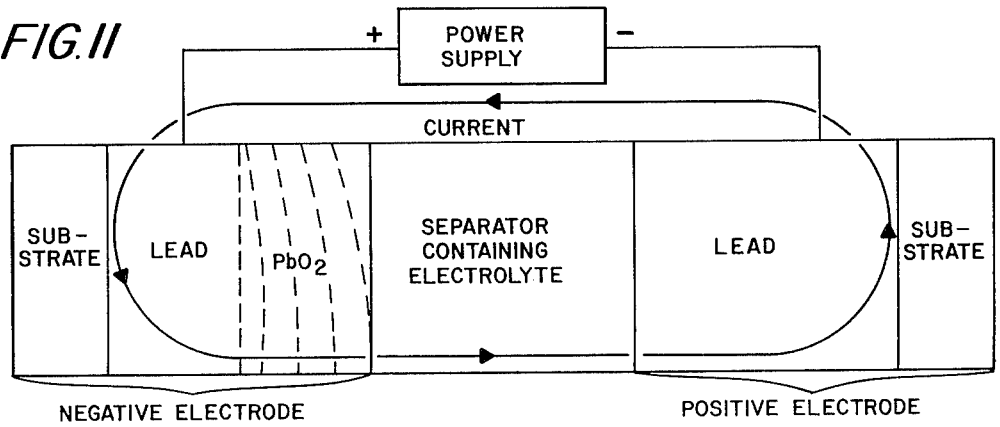
FIG. 11 is a diagrammatic view of the battery means of FIG. 10 illustrating chemical changes in the electrodes during a first phase of electrochemical formation.

FIG. 11 is a diagrammatic representation of a first phase of the particular Planté formation process of the invention. A power supply is connected to the battery in reversed polarity; that is, the positive output terminal of the power supply is connected to the negative terminal of the battery, etc. Electrical current, as indicated by the directional arrow, is caused to flow. The lead of the positive electrode will be unaltered in this step, while the lead of the negative electrode will be gradually electrochemically transformed into $PbO_2$, as is indicated by the curved dashed lines. It is pointed out that there may be a brief transitory phase to this transformation (not shown in FIG. 11) wherein a portion of the leading edge of the $PbO_2$-lead transition stage becomes $PbSO_4$ but this has no significance in the process. The electical current of this part of the formation process is to be discontinued when that (predetermined) portion of the lead of the negative electrode, which in its ultimate form is to be reactive or "sponge" lead, has been transformed into $PbO_2$. This cessation of current flow constitutes an important part of the process, since continued application of electrical current beyond the point indicated would result in a transformation to $PbO_2$ of that lead portion which is required to be non-reactive, and the relationship between the reactive and non-reactive portions of the negative electrode serves to provide the reactivity retarded characteristic to the battery during discharge.

Figure 12:
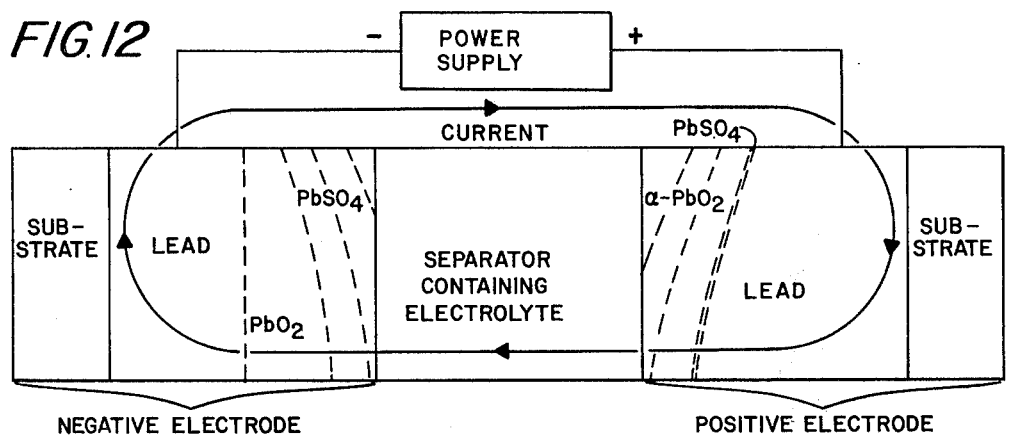
FIG. 12 is a view of the battery of FIG. 11 showing chemical changes taking place during a second phase of electrochemical formation.

A second phase of the formation process is illustrated diagrammatically in FIG. 12. In this Figure, a power supply is shown connected with conventional polarity (e.g. positive to positive), to the battery components of FIG. 11. As electrical current is caused to flow, as indicated by the directional arrow, the $PbO_2$ of the negative electrode becomes gradually electrochemically transformed into $PbSO_4$, as indicated by curved dashed lines at the left hand side of FIG. 12. Simultaneously, the metallic lead of the positive electrode is gradually transformed into $PbO_2$, again with there occurring a brief transistory $PbSO_4$ stage at the leading edge of the $Pb$-$PbO_2$ transition phase (shown in this Figure and in FIG. 13). Since the formation electrolyte employed comprises sulfuric acid of a relatively low specific gravity, the particular form of $PbO_2$ resulting from this phase of formation may be $\alpha$-$PbO_2$, a form which is somewhat less porous than "normal", or $\beta$-$PbO_2$.

Figure 13:
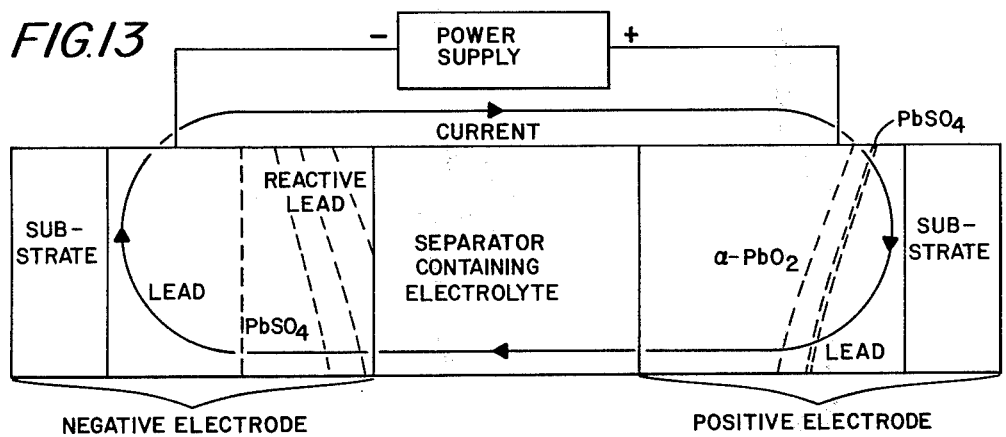
FIG. 13 is a view similar to FIGS. 11 and 12 showing chemical changes taking place during a third and final phase of electrochemical formation.
Figure 14:
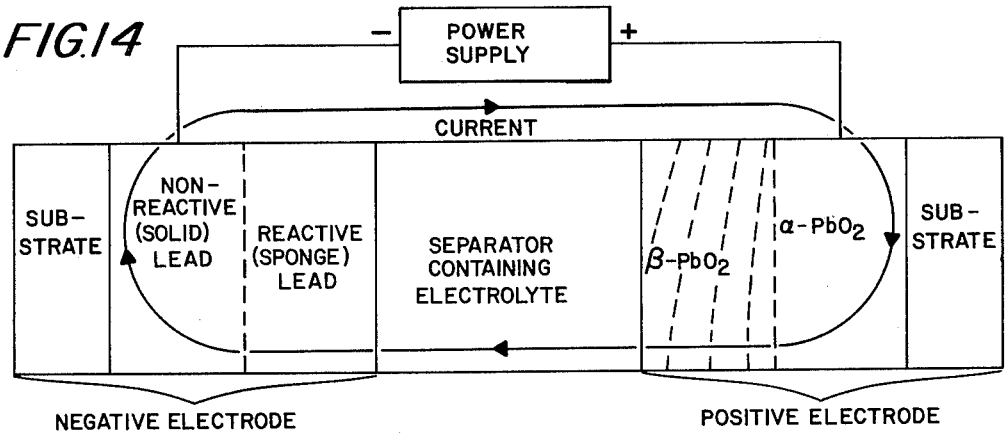
FIG. 14 is a view similar to FIGS. 11, 12 and 13 showing chemical changes which may occur in a positive electrode during an extended period of recharging.

As indicated diagrammatically in FIG. 13, after all of the $PbO_2$ of the negative electrode has been transformed into $PbSO_4$, continued electrical current flow will cause this $PbSO_4$ to be gradually transformed into reactive, or "sponge", lead as indicated by curved dashed lines. The transformation of the lead of the positive electrode into $PbO_2$ will continue during this period.

At this point when the $PbSO_4$ of the negative electrode has become completely transformed into reactive lead, the electrical current flow may be terminated, provided that a quantity of $PbO_2$ in the positive electrode at least equivalent to the reactive lead of the negative electrode has been produced. Some metallic lead may remain in the positive electrode. However, since this metallic lead, during normal recharging, will ultimately become $PbO_2$, this remaining lead must be of a mass sufficient to carry required current through the positive electrode after it has been completely transformed into $PbO_2$.

In a preferred process of Planté formation of the invention the electrical current flow will not be terminated as suggested above, but will be allowed to continue until all of the lead of the positive electrode has become transformed into $\alpha$-$PbO_2$.

During normal charge-discharge operation of the battery, since the formation electrolyte has been replaced by operating electrolyte of a relatively high specific gravity, outer portions of the $\alpha$-$PbO_2$ of the positive electrode may be further transformed into $\beta$-$PbO_2$ during recharge. $\alpha$-$PbO_2$ is formed by positively charging $PbSO_4$ in the presence of a low specific gravity acid; $\beta$-$PbO_2$ is formed by positively charging $PbSO_4$ in the presence of a higher specific gravity acid. Therefore, during normal operation, that portion of the $\alpha$-$PbO_2$ which becomes transformed into $PbSO_4$ during discharge will, upon recharge, be transformed into $\beta$-$PbO_2$. That $\alpha$-$PbO_2$ which has not been discharged due to the reactive limitation characteristic of the invention may remain $\alpha$-$PbO_2$. The varying depth of the $\beta$-$PbO_2$ portion is indicated by the curved dashed lines in FIG. 14.

A general example of a typical battery of the invention is hereby presented, setting forth numerical values for specific parameters.

Electrodes are fabricated from a laminated foil material such as that denoted by the arrow 32 in FIG. 5. Central core layer or substrate 34, of a suitable plastic material such as polyethylene or polypropylene, is 25 microns thick; outer lead layers 36 and 38 are also 25 microns thick. The total weight of this laminated foil will be 6.5 g/100 cm$^2$ of area, of which 5,5 g/100 cm$^2$ represents lead. The theoretical capacity of an electrode fabricated from such a material is 1.42 ampere-hours/100 cm$^2$ at the 10-hour rate. Inherently, however, the utilization of the reactive lead active material in a negative electrode at this rate will only be 70% and, further, it is desired to limit the depth of discharge of the battery of the invention to 56% in order to provide a long life. Therefore, the negative electrodes should be formed to some percentage "X" of their theoretical capacity such that:

$$x/(100\%) = (\text{desired \% discharge})/70\%$$

or $$x = (56\%)(100\%)/70\% = 80\%$$

Actual capacity "C" in ampere-hours may then be expressed as $$C = (\text{theoretical capacity})(\text{desired \% discharge})$$

or $$C = \left(1.42 \frac{\text{amp-hrs}}{100 \text{ cm}^2}\right)(56\%) = \frac{0.8 \text{ amp-hrs}}{100 \text{ cm}^2} \text{ (approx.)}$$

After formation to 0.8 ampere-hours/100 cm², the thickness of the negative electrodes will be 110 microns.

When this same material is used in positive electrodes, the theoretical capacity will again be (1.42 ampere-hours)/100 cm²

However, since the capacity of the negative electrodes has been limited to 0.8 ampere-hours/100 cm², no more than this amount can ever be taken from the positive electrode. The remaining $PbO_2$ of the positive electrode, that is 44%, which is called non-reacting $PbO_2$, will be available throughout the entire electrode as current carrying material. After formation, the weight of a positive electrode will be 7.3 g/100 cm²; thickness is selected to be 125 microns.

Operating electrolyte ($H_2SO_4$) will have a specific gravity of 1.320. The portion of this electrolyte utilized at the 10-hour rate will be approximately 80%. Therefore, 8.8 g or 6.7 cm³ of electrolyte must be absorbed in the separator means on each side of the positive plate. Assuming that the separator means comprises glass wool of 85% porosity, the separator means may be 0.4 mm thick, and the total weight of separator means including electrolyte will be 10.2 g/100 cm².

Characteristics of an electrode group comprising one positive electrode 100 cm² in area, one negative electrode 100 cm² in area, and two separators containing electrolyte will be as follows:
Weight: 24 g
Thickness: 1.035 mm
Capacity: 0.8 ampere-hours
Volume: 10.35 cm³
Energy Density: 0.155 watt-hours/cm³ = 155.0 watt-hours/liter = 0.077 ampere-hours/cm³ = /0.067 watt-hours/g = 67 watt-hours/kg.

As a more specific example of a "test cell," having specific parameters, a cell similar to that denoted by arrow 14 in FIGS. 2 and 3 is constructed having electrodes fabricated from laminated foils as specified above. Positive electrode 16 and negative electrodes 18 and 20 are initially identical in composition, and are 1 cm wide. Their length is chosen such that, when they are combined with a 0.4 mm thick separator means 22 as shown in FIG. 4, those portions of their length which are adjacent to one another are 10 cm long, resulting in an active surface area of 10 cm². The assembly of electrodes 16, 18, 20 and separator means 22, shown in FIG. 4, as earlier disclosed, is combined with wall portions 24 and 26 and held together by holding means such as tapes 28 and 30, as shown in FIGS. 2 and 3.

It is pointed out that, although there are two negative electrodes 18 and 20 present in such a cell, their outer lead layers which are closest to the wall portions 24 and 26 (these layers corresponding to those denoted by numerals 52' and 54' in FIG. 6) have no access to electrolyte, do not enter into the reactions, and are thus considered irrelevant in this example although they may function as current carrying means. The two negative electrodes 18 and 20 thus will have the same total capacity as a single negative electrode as described in the foregoing general example.

After assembly, separator means 22 may be partially saturated with a formation electrolyte comprising $H_2SO_4$ of 1.10 specific gravity, to which (8 g $KClO_4$)/(liter of $H_2SO_4$) has been added. Since the area of the electrodes is 10 cm² (per side) the expected capacity will be $$\frac{(0.80 \text{ amp-hrs})}{100 \text{ cm}^2} (10 \text{ cm}^2)$$

or 0.08 ampere-hours. Negative electrodes are to be formed to this value which, it will be recalled, corresponds to 80% formation and 70% utilization of negative active material. Theoretical capacity of the electrodes is 0.142 ampere-hours; thus an 80% formation will require approximately 0.12 ampere-hours of formation current.

The cell is connected to a power supply in the reversed polarity configuration as illustrated diagrammatically in FIG. 11, and is charged with the negative electrodes connected as positive electrodes at 10 milliamperes for a period of 12 hours. Following this, the power supply is connected conventionally as indicated diagrammatically in FIGS. 12-13 and charged at 10 milliamperes for 24 hours such that substantially all of the lead of the positive electrode becomes transformed into $PbO_2$. After the electrolyte gravity has been adjusted to an operating specific gravity of 1.320, a capacity of 0.081 ampere-hours at the 10-hour rate is realized.

It is pointed out that the separator means 22, being 0.4 mm thick, is capable of absorbing an amount of operating electrolyte substantially in excess of that required by the electrodes while being no more than 80% saturated with the said electrolyte. Therefore, in order to provide a path for oxygen transport from the positive electrodes to the negative electrode during charging, separator means 22 should be no more than 80% saturated with the operating electrolyte.

To further establish the practicality of this invention, an additional calculation may be set forth showing the voltage drop caused by the utilization of $PbO_2$ as the current carrier in the positive electrode. At the one hour rate the cell may be assumed to have a capacity of 0.05 ampere-hours. The non-reacting $PbO_2$ portion (worst case, i.e. end of discharge) will have a resistance of 0.4 ohms. The resistive voltage drop at this time will thus be (0.05 amperes) (0.4 ohms) = 0.02 volts, and therefore is not considered to be detrimental to operation.

As previously disclosed, the $PbO_2$ of the positive electrode may comprise either $\alpha$-$PbO_2$, more porous $\beta$-$PbO_2$, or a combination thereof. It is commonly assumed that the more porous material ($\beta$-$PbO_2$) will have a lower conductivity than the less porous $\alpha$-$PbO_2$. It is known to the battery art, however, that $\beta$-$PbO_2$, when maintained in a relatively confined state, will have a conductivity at least equivalent to that of $\alpha$-$PbO_2$; thus either form of $PbO_2$ will be operable.

It has earlier been pointed out that composite lead foils of the invention may be produced by various means, and that negative electrodes may be separately formed using dummy positive electrodes. It is hereby also disclosed that positive electrodes may be directly produced by deposition or application of $PbO_2$ layers of sufficient thickness directly upon a suitable substrate.

Similar principles may be applied to larger batteries such as mine lamp batteries. One such mine lamp battery is illustrated in FIG. 15 and denoted by the arrow 68.

Referring to FIG. 15, battery 68 comprises two cells, 70 and 72, in a common jar 74 of a suitable material, for example polycarbonate, internally divided by a partition 76 and having a bottom cap portion 78 and top cell cover portion 80. Bottom cap portion 78 and a top cell portion 80 may be affixed to jar 74 by means of solvent cementing, ultrasonic welding, or other means.

Extending through holes in top cell cover portion 80 are positive and negative terminal posts 82 and 84, respectively, which may be used to connect battery 68 to a suitable load or to charging means. Terminal posts 82 and 84 may be sealed to cell cover portion 80 by any conventional means, for instance epoxy resin 86. In addition, each cell may be provided with a sealable filling port as 100 at top and bottom thereof.

In accordance with the invention, there are provided a plurality of positive and negative electrodes of foil construction, generally denoted by the arrow 88, as well as separator means and electrolyte. The positive electrodes may be connected electrically to one another and to positive post 82 by suitable means such as, for example, a lead bridge 90. Negative electrodes may be connected together by similar means.

FIG. 16 illustrates a cross-section of an upper portion of one cell of a similar battery, in which a plurality of positive electrodes as arrows 92, negative electrodes as arrows 94 and electrolyte-bearing separator means as 96 are provided in a jar 98. Positive and negative electrodes as 92 and 94 may be fabricated from a lamination similar to that denoted by the arrow 32 in FIG. 5. FIG. 16 shows, for example, a plurality of positive electrodes each having a substrate as 102 and two outer layers of metallic lead as 104.

Interconnecting the positive electrodes as 92 is a lead bridge 106. This lead bridge 106 may, for example, be cast or soft welded to upper ends of the positive electrodes as 92, such that upper ends of their outer lead layers as 104 become integrated with the lead mass of the bridge 106. Protruding from an upper side of lead bridge 106 is a terminal post 108, which extends through cell cover 110. Sealing between post 108 and cell cover 110 may be accomplished in a conventional manner, such as by the use of epoxy as 112.

FIG. 17 illustrates, in an inverted position, a lower portion of the battery arrow 68 of FIG. 15, partially broken away. As was pointed out with respect to FIG. 15, battery 68 comprises two cells 70 and 72 in a common jar 74, the cells being separated from one another by internal partition 76.

Each cell includes a plurality of positive and negative electrodes of foil construction, as well as separator means. In cell 72 of FIG. 17 as illustrated a plurality of negative electrodes as 114, interconnected to one another by a lead bridge 116 which may be affixed to these electrodes in the manner disclosed with respect to FIG. 16. Protruding from one side of bridge 116 is a terminal post 118, which extends through bottom wall 120 of jar 74, and which is sealed to bottom wall 120 in a conventional manner.

Shown in cell 70 is one negative electrode 122 and one part 124 of separator means. Also shown is a plurality of positive electrodes as 126, which may be interconnected to one another by means of a lead bridge 128, having a terminal post 130, in the manner previously disclosed.

It is pointed out that each cell includes an electrode group internally disposed therein and comprising a plurality of positive electrodes, negative electrodes and separator means interleaved with one another and positive and negative interconnecting lead bridges with their associated terminal posts. All of such electrode groups are identical in composition to one another, although adjacent cells will contain electrode groups which are in an inverted position with respect to one another. In this manner cell interconnections may be simplified. For example, FIG. 17 shows that the negative terminal post 118 of cell 72 and the positive terminal post 130 of cell 70 lie adjacent to one another, and may be connected to one another by means of a lead connecting link 132, which may be fused to the said terminal posts in a conventional manner. If additional cells are to be employed, those cells which are to be electrocally connected to one another in series should be located adjacent to one another and should have their internal electrode groups inverted with respect to one another. Connecting links in this series configuration will alternate between upper and lower parts of the battery.

Each cell may also include sealable filling ports as 100' (FIG. 17) at its bottom portion, as previously disclosed. Sealable filling ports 100, 100' referred to above may be utilized in one desirable mode for introducing formation electrolyte into the cells, removal of the formation electrolyte after formation has been carried out and for introducting operating electrolyte into the cells. When these steps have been carried out ports as 100 and 100' may be sealed. These ports, in sealed state, may be designed to function as "blow off" valves to relieve extreme internal gas overpressures.

A typical battery for mine lamp use similar to battery 68 of FIG. 15 may include for example two cells, each containing 34 positive electrodes, each electrode having an active surface area of 5.7 cm $\times$ 16.4 cm equalling 93.48 cm$^2$, fabricated from foils as specified above. Also included may be 35 negative electrodes having a similar active surface area, and interleaved separator means. The total positive surface area will be 34 $\times$ 93.48 which equals 3.78 cm$^2$. Since the electrode group will have a capacity of 0.8 ampere-hour per 100 cm$^2$ of positive surface area at the 10-hour rate, the expected capacity will be $$\frac{3178}{100} = 0.8 = 25.4 \text{ ampere-hours.}$$

The total weight of the electrode groups for the two cells, including electrolyte, will be approximately 1.6 kilograms.

The above battery is designed to have the same dimensions, and thus the same volume, as a conventional mine lamp battery. This leads to some important comparisons whereby conventional ratio values are taken with reference to an index of 1.0:

|  | Reactively Retarded Battery | Conventional Battery |
| --- | --- | --- |
| Capacity | 25.4 amp-hrs. | 14 amp-hrs |
| Weight (incl. jar) | 1.84 kg | 1.96 kg |
| Power-to-Weight Ratio | 1.93 | 1.0 |
| Power-to-Volume Ratio | 1.81 | 1.0 |

Thus, the battery of the invention clearly meets the stated objectives of increasing power-to-weight and power-to-volume ratios.

As previously noted, one important object of this invention is to develop a battery construction which will resist "treeing". This "treeing" phenomenon is one of the primary causes of failure in conventional lead-acid batteries which are deeply cycled, and results from the fact that the electrolyte in a deeply discharged battery may suffer from an extreme depletion of sulfate ions available for reaction.

As the sulfate ions become depleted due to the well-known double-sulfate reactions, the specific gravity of the $H_2SO_4$ electrolyte decreases, approaching the standard 1.0 of water. This, in turn, allows the lead of the negative electrode to form soluble lead hydrates, for example $Pb(OH)_2$, rather than $PbSO_4$. These hydrates may then penetrate the formaninous separator means. Upon recharge, these hydrates will be transformed into lead and, after a sufficient amount of charge-discharge cycles, a bridge or "tree" of lead may be formed through the separator means thereby connecting the positive and negative electrodes to one another, producing an internal short-circuit within the battery cell.

Sealed or semi-sealed batteries utilizing a "starved electrolyte" principle, where the depth of discharge is deliberately limited by the amount of available sulfate ions, are extremely susceptible to this phenomenon. Should this principle be applied in a battery of the invention, where the distance between adjacent positive and negative electrodes is so small (e.g. 0.4 millimeters), treeing might severely shorten life.

The potential for treeing may be significantly reduced or eliminated in any conventional battery by: (1) providing an excess of available sulfate ions in the electrolyte, for example, by the addition of a salt such as $MgSO_4$; (2) by limiting the depth of discharge such that there are always sufficient sulfate ions available in the electrolyte; or (3) by a combination of (1) and (2) above. In this manner the formation of soluble lead hydrates may be precluded, and treeing substantially eliminated.

A salt such as $MgSO_4$ may, of course, be added to the electrolyte of a battery of the invention. However, the second procedure noted above is an inherent feature of a properly-designed battery of the invention in that, as previously disclosed, the depth of discharge is limited by the amount of reactive lead provided in the reactively limited negative electrode. The amount of sulfuric acid ($H_2SO_4$) electrolyte absorbed in the separator means is significantly greater than that amount required to discharge the battery to this limit, and thus no soluble lead hydrates can be formed.

As previously noted, one object of this invention is to make a sealed lead-acid battery. The "oxygen cycle" of gas recombination in such batteries, wherein oxygen evolved at the positive electrodes during charging becomes recombined with hydrogen at the negative electrodes to form water, is well-known to the art. Conditions prerequisite to such recombination include (1) a large surface area for the negative electrodes and (2) a relatively easy path of travel for the oxygen between the positive and negative electrodes. Also desirable may be some overpressure, e.g. an overpressure within a range of from 0.1 kilograms per square centimeter to 5.0 kilograms per square centimeter in the battery.

It will be apparent that a battery of the invention possesses a large amount of negative surface area, since the electrodes are so thin. The numerical example cited with respect to FIG. 15, for instance, possesses a negative surface area of 3.78 $cm^2$. The distance between positive and negative electrodes in the same example is 0.4 mm, comprising foraminous separator means only partially saturated with electrolyte, and thus the oxygen will have good access to the negative surfaces. In addition, provision made for sealing via sealable ports as 100, 100' (FIGS. 15, 17) may permit a desired releasable over-pressure.

Another stated object of the invention is to provide a battery which is capable of more rapid discharging and recharging than is possible with conventional batteries. Discharge and recharge rates are highly dependent upon the surface area of the electrodes with respect to the weight of active material in the electrodes. It is pointed out that foil electrodes of the nature disclosed in this specification possess an extremely great surface area, and thus discharging and recharging at faster rates will be facilitated.

As previously disclosed, foil electrodes for a battery of the invention may be provided in various forms. The first example shown, that denoted by arrow 32 in FIG. 5, comprises two outer layers 36 and 38 of lead laminated to both sides of a plastic substrate 34. It should be observed that in some instances, for example when the lead layers are to be added to the substrate by a rolling process, it may be desirable to provide the plastic substrate with perforated holes in which the outer lead layer may become rooted.

Other forms of foils are possible, and may in fact be desirable for certain applications. In certain cases, for example for negative electrodes or for positive electrodes which are to be very tightly confined, a substrate may not be necessary. Normally, however, some form of substrate is desirable to facilitate handling during manufacture and, in the case of positive electrodes, the formed $PbO_2$ may be quite brittle, thus requiring a substrate to preserve the integrity of the electrode.

Since the substrate may be required to function both as a reinforcement of the lead layers and of the $PbO_2$ layers produced in the positive electrode by electrochemical formation, it is important to provide a good bond between the substrate and the outer lead layers before formation. It has been found that, in a rolled foil, this bond may be enhanced by perforating the substrate prior to application of the lead layers. During the rolling process the opposing lead layers are forced into contact with one another through the perforations in the substrate and thus become integrated and bonded to one another by the pressure applied by the rollers.

In a preferred embodiment, however, the foils are mechanically modified prior to electrochemical formation such that the lead layers become rooted in the substrate. This modification is appropriate for foils produced by any of the methods disclosed above.

FIG. 17A illustrates a portion of a lead foil body, designated by the arrow 75, modified to provide this rooted relationship.

As shown in FIG. 17A, foil body 75 has, at its upper side 77, been pierced by a needle or other implement such that both upper lead layer 79 and substrate 81 have been deformed downwardly, so as to extend into lower lead layer 83. The hole produced by the needle actually extends entirely through the foil body at this point in the process.

It is pointed out that, at this time, there will be an annular (or other configuration) ridge of lead (primarily coming from layer 83) formed around the edge of the hole 85 at the lower surface 87 of FIG. 17A. This ridge may then be wiped over or otherwise flattened out to substantially close the hole, as indicated at arrow 89, thereby to provide an annular zone of intimate contact or bond between layers 79 and 83 as indicated by the arrows 91. It is well-known in the art that when lead is electrochemically formed into $PbO_2$ and the $PbO_2$ will expand and seek to occupy a larger volume than the original lead. In the present invention hold 85 remains open at upper surface 77, and thus provides an expansion chamber which may become filled with $PbO_2$ during electrochemical formation of a positive electrode, as indicated by dashed line 93.

Another form of foil electrode including a substrate comprises a laminate such as that denoted by the arrow 134 in FIG. 18, in which a plastic substrate 136 has affixed to one side thereof a single layer of lead 138. Such laminates may be arranged in pairs in abutting relationship to one another such that plastic sides are adjacent to one another to comprise electrodes and an enhancement of the bond between the lead layers and the substrate may be realized as noted above.

Stil another form comprises the configuration denoted by the arrow 140 in FIG. 19. In this form a substrate 142 actually comprises separator means, to one side of which has been applied a layer 144 of lead. Substrate 142 may consist of any appropriate foraminous material such as needle-punched polyester, glass wool, etc. Since these substrates are foraminous, and thus their surfaces are somewhat irregular, adherence of the lead layer to the substrate may be enhanced. In addition, there may result a savings in cost, volume and weight, since the non-operative plastic substrates of previously disclosed forms have been eliminated. It is also pointed out that the substrate may comprise fibrous material, mesh, etc.

To simplify construction of batteries using this form of foil electrode, one edge may be rolled or folded over to produce a configuration such as that denoted by the arrow 146 in FIG. 20. It is pointed out that the lead layer 148 of such a folded electrode will be on the outer side of the folded portion. Two such folded electrodes, as arrows 150 and 152, may be combined in abutting relationship, as shown in FIG. 21, such that their respective lead layers 154 and 156 are adjacent to one another, thus producing a compound electrode denoted by arrow 158.

One cell of a rectangular prismatic mine lamp battery, similar to arrow 68 of FIG. 15 but using such folded electrodes having separator means as a substrate, is denoted by the arrow 160 in the cross-sectional view of FIG. 22. Details of construction are similar in all aspects to those shown in FIGS. 15–17, except that the electrodes and separator means shown in these Figures have been replaced by folded electrodes similar to arrows 146 and 158 of FIGS. 20 and 21, respectively.

In FIG. 22 are shown a plurality of pairs of folded electrodes denoted by arrows 162. Each pair comprises two folded electrodes as 164 having layers of lead as 166 affixed to separator-substrate means 168, the folded electrodes of each pair being arranged in abutting relationship with one another in a configuration similar to that shown in FIG. 21. These pairs are employed as positive electrodes. Similar pairs of electrodes as arrows 170 are shown in an inverted position, interleaved between the positive electrode pairs as 162, and are employed as negative electrodes. On opposite sides of the electrode group are outer negative electrodes 172, 174 of single folded construction similar to that shown as arrow 146 in FIG. 20.

Adjacent laminated foils of opposing polarity are terminated and arranged such that spaces as 176 remain between the ends of these electrodes.

It is pointed out that, in this arrangement, separator-substrates as 166 of the positive electrodes abut separator-substrates as 176 of the negative electrodes, thus (in effect) acting as separator means of double thickness. Separator-substrate thickness will, therefore, be selected such that the combination of two such substrates results in separator means of a required dimension.

It may be desired to fabricate batteries of the invention in which individual cells may have a generally cylindrical configuration. FIG. 23 illustrates a four-volt mine lamp battery, generally denoted by the arrow 178, comprising two such cells 182, 184; FIG. 25 illustrates a cross-section through one of the said cells, namely 182. In each cell the arrangement of electrodes and separator means is of the configuration known to the art as "jellyroll"; such an arrangement, partially unrolled, is denoted by the arrow 180 in FIG. 24.

Referring in detail to FIGS. 23 and 25, battery 178 comprises two cells, 182 and 184, in a common jar 186 having a cell cover 188 including sealable ports as 214, which may also comprise one-way pressure release valve means, at its upper end and a bottom cap 190 at its lower end. The bottom wall 216 of jar 186 is also provided with sealable ports as 218 (FIG. 25), one for each cell. "Jelly-roll" 180 comprises four strips of material combined and rolled as shown; strip arrow 192, which will become a positive electrode after formation, may comprise a laminated lead foil similar to that illustrated in FIG. 5, having a plastic substrate 194 with layers 196, 198 of lead affixed to sides thereof. Strip arrow 200, which will after formation become a negative electrode, is of similar construction having a plastic substrate 202 with layers 204, 206 of lead affixed to sides thereof. Strips 208, 210 comprise foraminous separator means.

Strips 192, 208, 200, 210 are wrapped or rolled into a cylindrical configuration such that, penetrating inwardly, there would occur first separator means 210, then foil 200, then separator means 208, then foil 192, then separator means 210, etc. It is pointed out in FIG. 25 that, at the center of the roll, due to the inherent nature of a roll of material, two layers 196 of lead will be adjacent to one another separated only by a space 212, the dimension of which space will depend upon the tightness of the roll.

It will be seen from an examination of FIGS. 24 and 25 that strips 192, 208, 200, 210 are vertically offset from one another such that the upper edge of strip 192 is the uppermost extremity of roll 180 and the lower edge of strip 200 is the lowermost extremity of the said roll. Separator means 208, 210 are arranged such that some portions of these strips is always found between adjacent surfaces of the foil strips 192, 200.

A battery of this nature, made with laminated foils and separator means previously specified having a height of 150 mm and wrapped to a diameter of 50 mm, will have a capacity of 22.5 ampere-hours at the 10-hour rate. Assuming that the capacity at the one-hour rate will be 15 ampere-hours, the total voltage drop due to the use of $PbO_2$ as a current collector will be 0.048 volts at the one-hour rate which is negligible.

It has earlier been disclosed that different forms of foil electrodes may be utilized in batteries of the invention; this applies to batteries having electrode groups of the "jelly-roll" type as well as to those utilizing electrode groups comprising interleaved sheets of electrode material. FIG. 26 illustrates, partially unrolled, a jellyroll electrode group, arrow 236, comprising four folded electrode strips 238, 240, 242, 244 similar to that denoted by the arrow 146 in FIG. 20. The four strips are arranged in pairs (similar to FIG. 21) to comprise two compound electrodes, arrows 246, 248.

It may be desired to provide cylindrical batteries of the invention in a single-celled configuration somewhat similar to that of conventional single-celled batteries. Such a battery is illustrated as arrow 250 in FIG. 27, and is shown in cross-section in FIG. 28.

Figure 28:
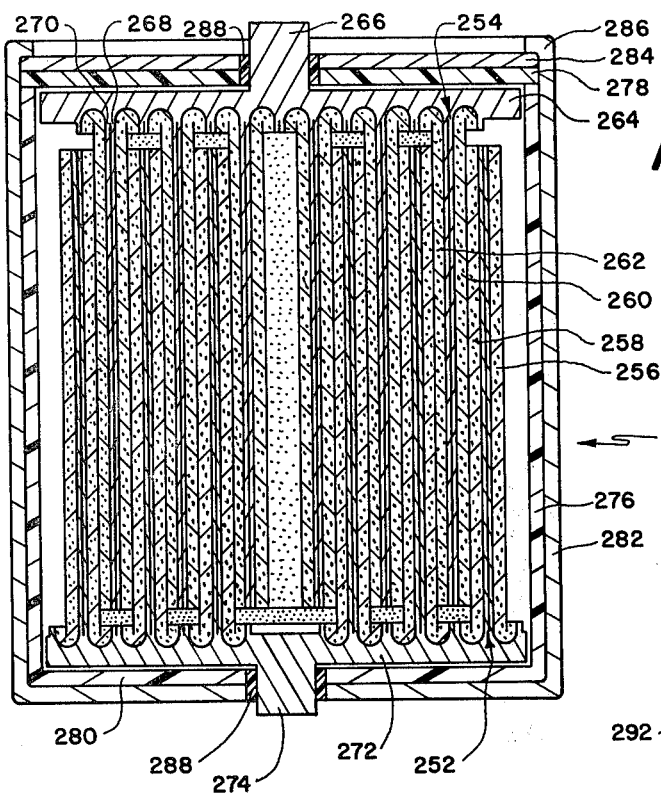
FIG. 28 is a cross-sectional view taken on the line 28—28 of FIG. 27 showing the use of the composite electrode structure of FIG. 26.

The electrode group construction shown in FIG. 28 is similar to that denoted by arrow 236 in FIG. 26. One pair of strips arrow 252 (corresponding to arrow 248 of FIG. 26) functions as a negative electrode, and another pair of strips arrow 254 (corresponding to arrow 246 of FIG. 26) functions as a positive electrode. Separator-substrates 256, 258, 260 and 262 will be partially saturated with electrolyte, both during formation and operation.

Upper edges of the wrapped positive electrodes 254 are interconnected by a lead bridge 264, which may be a complete disc, and which includes a positive terminal post 266. Bridge 264 may be cast or soft-welded in place such that lead layers 268 and 270 of the positive electrodes become integrated into the mass of the said bridge. A similar bridge 272, including a negative terminal post 274, is combined with the lower edge of negative electrode 252 in a similar manner.

The electrode group may be confined first within a relatively thin inner enclosure body 276, comprising a cylinder of a plastic material chemically inert to $H_2SO_4$ such as polyester or a polyolefin, open at one end and having an inner cover 278 of a similar material affixed to and substantially closing the open end. Inner cover 278 and bottom wall 280 of the inner enclosure body 276 may be provided with holes through which positive terminal post 266 and negative terminal post 274, respectively, may extend. Formation electrolyte may be introduced via openings around these posts in a manner similar to that earlier disclosed; Planté formation of the invention may then be caused to take place, and the formation electrolyte removed and replaced by an operating electrolyte through these same openings.

The formed battery may then be further enclosed in a relatively strong outer cylindrical container 282, open at one end, which may be fabricated for example from aluminum or steel. Container 282 may also be provided with a hole at its bottom side through which negative terminal post 274 may extend. An upper closure part 284 of a similar material, pierced to allow positive post 266 to extend therethrough, may be provided at the open end of outer cylindrical container 282, and may be held in place by clinching over the upper extremity 286 of the outer container 282 as shown. After the battery has been electrochemically formed and an operating electrolyte introduced, the openings around terminal posts 266 and 274 may be sealed, such that these posts become bonded to inner cover 278 and upper closure part 284 and to inner enclosure body 276 and outer container 282, respectively, by employment of a suitable insulating and sealing compound such as epoxy resin 288.

Figure 29:
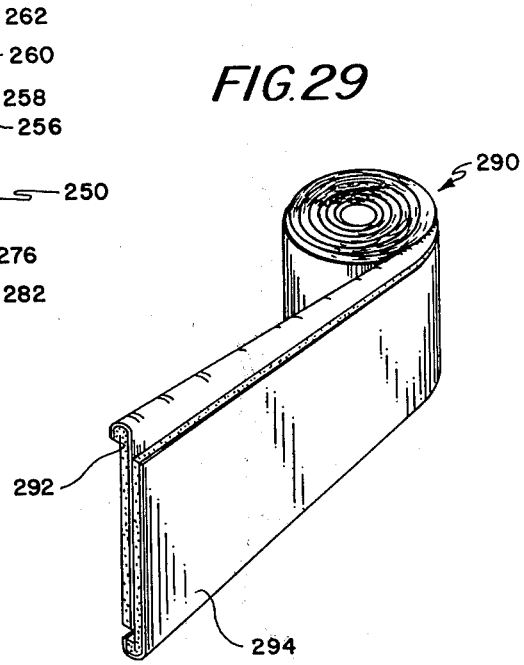
FIG. 29 is a view similar to that of FIG. 24 but showing the use of composite electrodes of the type shown in FIG. 20.
Figure 30:
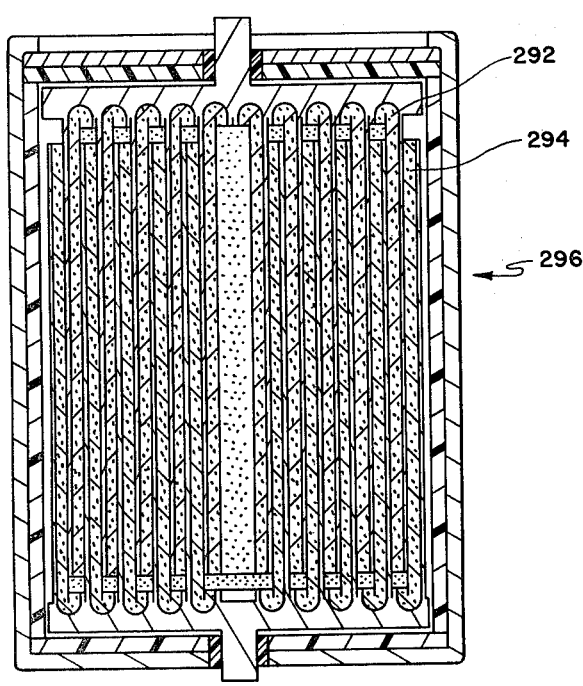
FIG. 30 is a cross-sectional view of a single cell having a "jelly-roll" type of internal construction and utilizing the composite electrode structure of FIG. 29.
Figure 31:
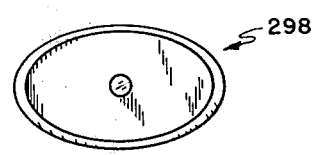
FIG. 31 is a plan view of a single cell of the invention having an elliptical cross-section.
Figure 32:
FIG. 32 is a diagrammatic view representing gridless electrode and separator means being wrapped about an elliptical mandrel.

A similar battery may be constructed utilizing an electrode group of the type denoted by the arrow 290 in FIG. 29, comprising two strips 292, 294 of folded electrode material of the nature of that denoted by the arrow 146 in FIG. 20. Such a battery is denoted by the arrow 296 in the cross-sectional view of FIG. 30 in which strip 292 functions as a positive electrode, and strip 294 functions as a negative electrode.

Batteries of the invention similar in nature to the jelly-roll nature previously described, but having cross-sections of differing configurations, may also be produced. One such battery, having an elliptical cross-section, is denoted by arrow 298 in FIG. 31. An electrode group for such a battery may be produced by wrapping interlayered strips of electrode material and separator means (shown diagrammatically as numeral 300 in FIG. 32) about a mandrel 302, then adding appropriate bridges, etc. and placing the said electrode group into an appropriately-shaped container in the manner previously disclosed. The mandrel may be removed or, if it is of a suitable material, allowed to remain in place. Alternatively, a jelly-roll having a round cross-sectional configuration may be reformed into a different shape by the application of external pressure prior to the addition of interconnecting lead bridges.

Reactively limited foil electrodes of the invention may be fabricated having various thicknesses of lead layers. An appropriate range for such thicknesses may be between 4 and 300 microns.

Disclosed herewith are two additional numerical examples, specifying lead thicknesses of different dimension, denoted as Examples A and B.

EXAMPLE A

Positive electrodes are fabricated from a laminated foil having layers of lead, 60 microns thick, affixed to each side of a 20 micron thick plastic substrate. The total thickness of such a foil, prior to formation, will be 0.14 mm. After Planté formation to a depth of 50 microns, the total thickness will be 0.25 mm and the theoretical capacity 2.89 ampere-hours/100 $cm^2$. Any lead remaining in the positive electrodes after Planté formation will become totally oxidized to $PbO_2$ after a few charge-discharge cycles. Since the negative electrodes will be utilized to limit the depth of discharge of the positive electrodes, the actual usable capacity of the positive electrodes will be 1.7 ampere-hours/100 $cm^2$ and their weight will be 15.9 g of lead/100 $cm^2$.

Negative electrodes are fabricated from a laminated foil having layers of lead 50 microns thick affixed to each side of a 20 micron thick plastic substrate. The thickness of such a foil, prior to formation, will be 0.12 mm. After Planté formation to a depth of 40 microns, the total thickness will be 0.2 mm, and the weight will be 8.8 g of lead/100 $cm^2$.

The operating electrolyte to be employed will be $H_2SO_4$ of 1.320 specific gravity. In order to obtain a capacity of 1.7 ampere-hours/100 $cm^2$ and still limit electrolyte utilization to 80%, the required thickness for separator means will be 0.65 mm; the weight of two such separators, including the operating electrolyte, will be 16 g/100 $mm^2$.

The total weight of an electrode group comprising one positive electrode, one negative electrode and two separators containing an operating electrolyte will be 43 g/100 $cm^2$. Energy density (without jar) will be 79 watt hours/kg.

The electrodes may be Planté formed using sodium perchlorate or organic acids as forming agents in the formation electrolyte. Organic acids will gradually be oxidized, and sodium perchlorate may be either washed away or left in the battery, as previously disclosed.

Example B

Positive and negative electrodes are fabricated from laminates comprising layers of lead 4 microns thick affixed to each side of a 13 micron thick plastic substrate. When the lead present in the positive electrode has been formed to $PbO_2$, 50% of such $PbO_2$ will be utilized as active material (reacting $PbO_2$) and the remaining 50% (non-reacting $PbO_2$) will be utilized as current-carrying means. Formed capacity of the electrodes will be limited by the negative electrodes to 0.06 ampere-hours/100 $cm^2$. Employing separator means 50 microns thick, the energy density will be 71 watt-hours/kg or 0.17 watt-hours/$cm^3$. In a cell of "jelly-roll" construction the energy density will be approximately 65 watt-hours/kg. The capacity at the 10-minute discharge rate will be 80% of the capacity at the 3-hour rate, and even higher discharge rates may be possible.

The advantages accruing to this example include a minimal change in capacity with differing discharge rates and a very rapid formation and recharge capability.

As previously noted, one object of the invention is to devise a method of forming lead-acid batteries wherein environmental as well as health hazards may be substantially controlled or eliminated. the most prevalent of such hazards present in conventional battery construction is the presence of free lead particles or lead oxide which may occur as airborne respirable particles or as ingestable material. The use of foil batteries as electrode material precludes the occurrence of such free lead particles. In a preferred embodiment, wherein formation of the lead of positive electrodes to $PbO_2$ takes place in situ within a cell body, no free $PbO_2$ will be present in the manufacturing environment of a battery of the invention.

Particularly in the case of batteries of the invention employing electrode groups of a "jelly-roll"construction, assembly of the electrode groups may easily be automated to a degree such that manufacturing personnel will only come into contact with lead during loading and unloading of the automated equipment. In this manner, it will be seen that exposure to lead and/or lead oxides, common to conventional battery manufacture, is avoided.

It is further pointed out that in a battery of the invention, reactive limitation of the positive electrodes is essential. As earlier disclosed, in a preferred embodiment of the invention reactive limitation of the positive electrodes is accomplished by the use of reactively limited negative electrodes. However, positive electrodes may be reactively limited by limiting the degree of discharge of the said positive electrodes without being subject to control by the negative electrodes. This may be done, for example, by utilizing external electrical circuit means such as electrical timing means to limit the duration of the discharge. In this manner, non-reacting $PbO_2$ portions of positive electrodes may be maintained while the negative electrodes may, in some cases, be reduced in mass and current-carrying capability.

What is claimed is:

1. A lead-acid battery construction including positive and negative electrode means supported in contact with separator means in which is contained an electrolyte, characterized in that the positive and negative electrode means are free from grid structure and reactively limited and further characterized in that the negative electrode means is provided with reactive and non-reactive lead portions which determine and limit dimensional characteristics of reacting and non-reacting $PbO_2$ portions of the positive electrode means, the non-reacting $PbO_2$ portions of the positive electrode means and the reactive lead portions of the negative electrode means arranged in series and being of a mass operative to function as sole means for conducting a required electrical current into and out of the electrode means.

2. The invention of claim 1 in which the positive and negative electrode means comprise thin foil bodies.

3. The invention of claim 2 in which the thin foil bodies of the positive electrode means includes substrate means arranged to reinforce the said foil bodies.

4. The invention of claim 3 in which the substrate means is formed with perforations.

5. The invention of claim 4 in which some of the component parts of the positive electrode extend through the said perforations in the substrate means.

6. The invention of claim 5 in which the said parts of the non-reacting $PbO_2$ portions of the positive electrode means extend through the substrate and are in intimate contact with corresponding non-reacting $PbO_2$ portions at an opposite side of the substrate means.

7. The invention of claim 1 in which the extent of the reacting portions of the positive electrode means is determined and limited by electrical discharge control means located externally of the said battery construction.

8. A lead-acid battery construction including gridless positive and negative electrode means supported in contact with separator means in which is contained an electrolyte,
characterized in that the positive electrode means is reactively limited to present reacting and non-reacting $PbO_2$ portions, the dimensional characteristics of the said reacting $PbO_2$ portions of the positive electrode means being determined and limited by means located externally of the positive electrode means such that the non-reacting $PbO_2$ portions of the positive electrode means are of a mass operable to function as sole means for conducting a required electrical current into and out of the positive electrode means during charging and discharging of the battery.

9. A lead-acid battery construction including positive and negative electrode means supported in contact with separator means in which is contained an electrolyte,
characterized in that the positive and negative electrode means are reactively limited and the reactively limited positive electrode means comprises reacting and non-reacting $PbO_2$ portions and the reactively retarded negative electrode means is provided with reactive (porous) and non-reactive (solid) lead portions, the said non-reactive lead portions of the negative electrode means and the non-reacting $PbO_2$ portions of the positive electrode means being arranged in series and being of a mass operable to function as sole means for conducting a current during charging and discharging of the battery.

10. The invention of claim 9 in which the reactive lead of the negative electrode means occurs in a mass capable of determining and limiting the mass of the reacting $PbO_2$ of the positive electrode means to an extent which will enable the reactive lead portions of the negative electrode means and reacting portions of $PbO_2$ of the positive electrode means, in the presence of the said electrolyte, to generate a required electrical current during discharging of the battery.

11. The invention of claim 10 in which the electrical current required to be generated is limited to a magnitude which can be carried cooperatively by the said non-reactive lead portions of the negative electrode means and the non-reacting $PbO_2$ portions of the positive electrode means arranged in series with one another.

12. The invention of claims 9, 10 or 11 in which the reactive and non-reactive portions of the negative electrode means are produced by controlled electrochemical formation of relatively thin layers of lead foil arranged in interleaved relationship with separator means and with said positive electrode means, the said electrode means and separator means occurring in the relationship of separator-negative-separator-positive-separator-negative, etc. and the said separator means occurring in a thickness operable to contain an excess of electrolyte as defined by discharge requirements with the separator means being in a less than saturated state.

13. A lead-acid battery construction including separator means, an electrolyte contained in the separator means, and gridless reactively limited positive and negative electrode means, said negative electrode means including reactive (sponge) lead portions and non-reactive (solid) lead portions, and said positive electrode means including $PbO_2$ of which at least one portion is reacting during operation and at least one other portion of which is non-reacting during operation, the reactive lead portions of the negative electrode means and the reacting $PbO_2$ portions of the positive means, in combination with the electrolyte, being operable to electrochemically generate a required current over a required period of time, the said non-reactive lead portions of negative electrode means and the non-reacting $PbO_2$ portions of the positive electrode means cooperating in series to carry the required current.

14. The invention of claim 13 in which the reactively limited negative electrode means are produced by controlled electrochemical formation of relatively thin lead foil layers and the said positive and negative electrode means being dimensionally limited to impart a predetermined power-to-weight ratio to the battery when the battery is operated.

15. The invention of claim 13 in which the reactively limited negative electrode means are produced by controlled electrochemical formation of thin layers of lead foil and the said positive and negative electrode means being dimensionally limited to provide a predetermined power-to-volume ratio to the battery when the battery is operated.

16. The invention of claim 13 in which the positive and negative electrode means comprise relatively thin layers of lead foil in intimate contact with the separator means and the reactive limitation of the negative electrode means is produced by controlled electrochemical formation of the relatively thin foil layers of the negative electrode means.

17. The invention of claim 13 in which the saturation of the separator means with electrolyte is limited to a degree such that oxygen is free to pass between the positive and negative electrode means.

18. The invention of claim 13 in which the degree of saturation of the separator means with electrolyte is limited to a maximum of 80%.

19. In a method of discharging a lead-acid battery to induce an electrical current, in which battery positive and negative electrode means are supported in contact with interleaved separator means having an electrolyte absorbed therein, the steps which include providing the positive electrode means of $PbO_2$ which may be divided into reacting and non-reacting portions, and further providing the negative electrode means in a reactively limited state in which the negative electrode means constitutes reacting (sponge) lead and non-reacting (solid) lead portions, and instituting an electrochemical reaction which generates an electrical current, the duration of the said reaction being limited by the mass of reactive lead in the negative electrode means which, in turn, determines and limits the extent of the reacting portions of $PbO_2$ in the positive electrode means, and conducting the said electrical current through the non-reacting $PbO_2$ portions of the positive electrode means and the non-reactive lead portions of the negative electrode means in series with one another.

* * * * *